March 11, 1941.   W. F. SCHAUB ET AL   2,234,386
VALVE FOR SHAMPOO HOSES AND THE LIKE
Original Filed Dec. 9, 1938

Inventors
Walter F. Schaub,
John H. McCrery,

By Clarence A. O'Brien
and Hyman Berman
Attorneys

Patented Mar. 11, 1941

2,234,386

UNITED STATES PATENT OFFICE 2,234,386

VALVE FOR SHAMPOO HOSES AND THE LIKE

Walter F. Schaub, Benton Harbor, and John H. McCrery, Coloma, Mich.

Substitute for abandoned application Serial No. 244,855, December 9, 1938. This application July 24, 1940, Serial No. 347,343

1 Claim. (Cl. 251—40)

The present application is a substitute for application Ser. No. 244,855, filed Dec. 9, 1938.

Our invention relates generally to shampoo hose apparatus and the like, and particularly to an arrangement of this character involving a valve fitting interposed between the stand pipe of the lavatory fixture and the shampoo hose, and in which provision is made for cutting off the flow of water while the shampoo hose is in an inoperative depressed position, to permit the passage of water to the shampoo hose while the shampoo hose is in an elevated operative position, and an important object of our invention is to provide a simple, practical, and relatively inexpensive arrangement of this character.

Other important objects and advantages of our invention will be apparent from a reading of the following description taken in connection with the drawing, wherein for purposes of illustration we have shown a preferred embodiment of our invention.

In the drawing—

Figure 2:
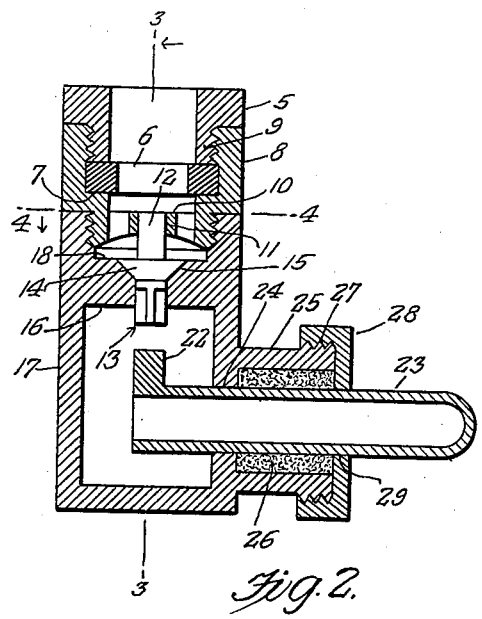
Figure 2 is a transverse vertical sectional view taken through Figure 1 approximately on the line 2—2 and looking toward the right in the direction of the arrow.
Figure 3:
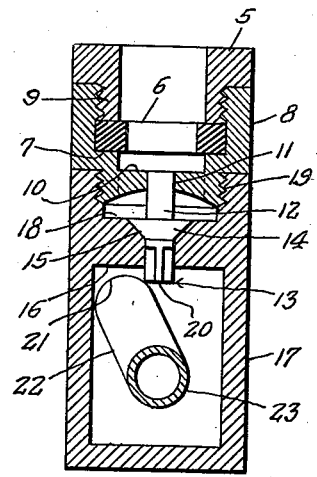
Figure 3 is a transverse vertical sectional view taken through Figure 2 approximately on the line 3—3 and looking toward the left in the direction of the arrow.
Figure 4:
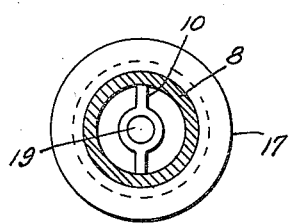
Figure 4 is a horizontal sectional view taken through Figure 2 approximately on the line 4—4 and looking downwardly in the direction of the arrow.
Figure 1:
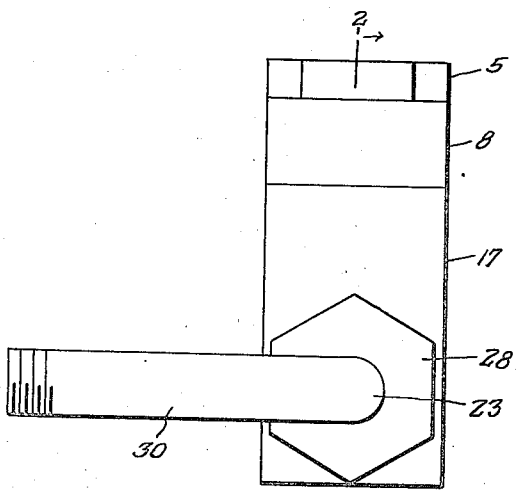
Figure 1 is a general side elevational view of the embodiment.

Referring in detail to the drawing, the numeral 5 generally designates a collar to receive the depending portion of the lavatory fixture standard with its end in abutment with the top of the compressible washer 6, the washer being held down in place on a shoulder 7 in the valve cage 8 which is threaded on the exterior depending portion 9 of the part 5. The shoulder 7 rises circularly around a platform 10 which has an opening 11 slidably and conformably receiving the shank 12 on the valve which is generally designated 13 and which comprises intermediate its ends the frustro-conical or mushroom-shaped element 14 which is designed to seat gravitationally on the conformably shaped valve seat 15 which is formed in the partition 16 adjacent the upper end of the valve casing 17, the walls of the valve casing rising around the side wall 18 in which the valve seat is formed being threaded to receive the depending reduced threaded portion 19 on the lower end of the valve cage 8. Below the mushroom part 14 the valve has a depending cruciform cross section part 20 which is arranged to be operatively engaged by the laterally outward rounded end 21 of the cam 22 which is formed on the axially inward end of the rotary L-shaped tube 23 to which the shampoo hose (not shown) is to be attached in the usual manner. The tube 23 is mounted through an opening 24 in one side wall of the valve casing 17 and around this opening extends concentrically a cup-shaped part 25 which encloses a packing gland 26, the part 25 being exteriorly threaded as indicated by the numeral 27 to receive the closure and compression cap 28 which has an opening 29 rotatably receiving the pipe 23. The right angular arm of the pipe 23 is designated by the numeral 30, and it is to the outer extremity of this arm that the shampoo hose (not shown) is attached in a usual manner.

It will be obvious that in using the valve of the present invention the water from the stand pipe of the lavatory fixture is constantly in the upper end of the valve and is excluded from the chamber below the valve 13 only by reason of a seated condition of the valve 13. The cam 22 is arranged at such an angle that while the shampoo hose holds the arm 30 of the pipe 23 in a depressed position the cam is out of engagement with the valve but while the shampoo hose is held in an elevated position and the arm 30 of the pipe 23 in a correspondingly elevated position the cam is in engagement with the valve 13 and raises the same so as to establish communication between the upper part of the valve and chamber below the valve and thereby pass the water from the stand pipe to the shampoo hose.

Although we have shown and described herein a preferred embodiment of our invention, it is to be definitely understood that we do not desire to limit the application of the invention thereto, and any change or changes may be made in the structure and arrangement of the parts, within the spirit of the invention and the scope of the subjoined claim.

Having described the invention, what is claimed as new is:

A valve for coupling a hose line to a faucet comprising a tubular valve casing having an open upper end, a closed bottom, and an annular internal flange adjacent its upper end forming a beveled valve seat, means for securing the casing to said faucet comprising a coupling threaded onto the upper end thereof and having a spiderlike valve stem guide therein, a beveled valve disk in said casing seating downwardly on said seat and having a valve stem slidable at one end in said guide and extending at its other end below said seat, a tubular rotatable valve elevating member extending laterally out of said casing adjacent the bottom thereof and having an outer end for connection of the hose line thereto whereby said member may be rotated under manipulation of said hose, and a cam on the inner end of said member for engagement with said other end of said stem under rotation of the member to thereby elevate said valve.

WALTER F. SCHAUB.
JOHN H. McCRERY.